United States Patent

Park et al.

[11] Patent Number: 5,970,055
[45] Date of Patent: Oct. 19, 1999

[54] RADIO COMMUNICATION SYSTEM ADAPTING TIME DIVISION DUPLEXING/FREQUENCY HOPPING

[75] Inventors: Jong-Hyeon Park, Seoul; Je-Woo Kim, Seongnam; In-Seen Baek, Ahnyang, all of Rep. of Korea

[73] Assignee: SamSung Electronics Co., Ltd., Kyungki-do, Rep. of Korea

[21] Appl. No.: 08/917,062

[22] Filed: Aug. 25, 1997

[30] Foreign Application Priority Data

Aug. 24, 1996 [KR] Rep. of Korea .................... 96-35460

[51] Int. Cl.⁶ .................................................. H04J 13/06
[52] U.S. Cl. .......................................... 370/280; 375/202
[58] Field of Search ................................ 370/277, 280, 370/294; 375/200, 202; 714/797, 782, 784, 776

[56] References Cited

U.S. PATENT DOCUMENTS

| | | | |
|---|---|---|---|
| 4,694,466 | 9/1987 | Kadin ...................................... | 375/367 |
| 4,760,586 | 7/1988 | Takeda .................................... | 375/202 |
| 5,541,954 | 7/1996 | Tetsuichi ................................ | 375/202 |
| 5,796,760 | 8/1998 | Wiedman et al. ...................... | 375/200 |
| 5,802,110 | 9/1998 | Watanabe et al. ..................... | 375/259 |

*Primary Examiner*—Chau Nguyen
*Assistant Examiner*—Fred Wolkow
*Attorney, Agent, or Firm*—Robert E. Bushnell, Esq.

[57] ABSTRACT

A radio communication system adapting TDD/FH, for reducing interference of jammer, preventing third party's hearing, and enhancing frequency usage efficiency. The radio communication system adapting time division duplexing/frequency hopping, having: a data source for providing transmission data or receiving input of reception data; a hop frequency generator for generating frequency changed as frequencies preset at every given time; a frequency modulator for modulating frequency according to the transmission frequency corresponding to the hop frequency with provision of the transmission data; a power amplifier for power-amplifying output of the frequency modulator; an antenna for receiving input of a signal outputted from the power amplifier at a regular time period and radiating the inputted signal or receiving reception data; a bandpass filter for bandpass-filtering reception data received from the antenna depending upon the hop frequency; a switch for connecting the antenna with the power amplifier upon transmission and connecting the antenna with the bandpass filter upon reception; a reception frequency mixer for receiving input of the bandpass-filtered reception signal and mixing the received signal with reception frequency corresponding to the hop frequency; an intermediate frequency mixer for receiving output of the reception frequency mixer and mixing the received signal with an intermediate frequency; and a frequency demodulator for receiving output of the intermediate frequency mixer, demodulating frequency, and again inputting the demodulated frequency to the data source.

17 Claims, 4 Drawing Sheets

RADIO COMMUNICATION SYSTEM ADAPTING TIME DIVISION DUPLEXING/FREQUENCY HOPPING

CLAIM OF PRIORITY

This application makes reference to, incorporates the same herein, and claims all benefits accruing under 35 U.S.C §119 from an application entitled *Radio Communication System Adapting Time Division Duplexing/Frequency Hopping* earlier filed in the Korean Industrial Property Office on Aug. 24, 1996, and there duly assigned Ser. No. 96-35460 by that Office.

BACKGROUND OF THE INVENTION

1. Field of the Invention

The present invention relates to a radio communication system of a FM (frequency modulation) modulation/demodulation type and, more specifically, to a radio communication system adapting time division duplexing/frequency hopping.

2. Description of the Related Art

A general radio communication system performs communication using a fixed carrier wave upon communication. That is, after setting the transmission/reception frequency determined in a frequency setter, the communication is performed with the above set transmission/reception frequency until the communication is ended. In a radio communication system of frequency modulation/demodulation, which is a kind of the radio communication systems as described above, data is generated from a data source and input to a low pass filter and lowpass-filtered. Meanwhile, a frequency setter controls a transmission frequency combiner so as to convert the data of the preset transmission frequency. The transmission frequency combiner inputs the transmission frequency corresponding to the transmission frequency preset in an FM modulator, to the FM modulator in correspondence with the control of the frequency setter. At this time, the FM modulator receives the lowpass-filtered data and performs the frequency modulation according to the transmission frequency. Here, the frequency-modulated data is called the transmission data. The transmission data is input to a band pass filter and the bandpass-filtered transmission data is input to a power amplifier. The power amplifier amplifies the bandpass-filtered transmission data which is then again input to another band pass filter which bandpass-filters the amplified transmission frequency prior to being output to a duplexer. The duplexer radiates the bandpass-filtered transmission data through an antenna.

In the meanwhile, upon reception, a signal received from the antenna is input through the duplexer to a tuner and a tuning frequency of the tuner is provided as the same frequency as the frequency preset in the frequency setter. Also, the output of the tuner is input to a low noise amplifier which amplifies the signal and provides the amplified signal to a mixer. The mixer mixes the reception frequency preset in the frequency setter with the reception signal of the low noise amplifier and performs a typical down-conversion.

On the other hand, the output of the mixer is input to a band pass filter and forms a reception signal of the intermediate frequency level. The reception signal is input to another mixer and mixed with an intermediate frequency. The mixed signal is input to an FM demodulator and the output of the FM demodulator as a bandpass signal is input through a low pass filter to the data source.

In the radio communication system of the FM modulation/demodulation as mentioned above, the transmission/reception frequency used in the communication is fixed. Accordingly, it is difficult to perform the communication in the case that there is interference by an intentional or unintentional jammer. Further, since the communication is performed by using the fixed carrier wave, there is a problem in that a third party can easily hear it, intentionally or unintentionally.

The foregoing communication system uses FDD (frequency division duplexing). The FDD is used to discriminate, with certainty, the transmission frequency band and the reception frequency band. It is known to position a guide band between the transmission frequency band and the reception frequency band, in order to reduce the interference between the transmission frequency and the reception frequency. In accordance with this, it results in deterioration of frequency usage efficiency with limited radio wave source in case of the FDD. Also, it is required with the duplexer because of performing the communication with one antenna. Resultedly, the cost may be increased accordingly.

Furthermore, the radio communication system as stated above is affected by the intentional or unintentional jammer, thereby lowering the frequency usage efficiency. It is known to use frequency hopping in some spread spectrum communication systems to avoid intentional or unintentional jammer. Two examples of radio communication systems using frequency hopping are found in U.S. Pat. No. 4,694,466 to Joseph Kadin and entitled *Time Sharing Frequency Synthesizer*, and U.S. Pat. No. 4,760,586 to Shigeki Takeda and entitled *Spread Spectrum Communication System*.

SUMMARY OF THE INVENTION

It is an object of the present invention to provide a radio communication system adapting time division duplexing/frequency hopping (TDD/FH), for reducing jamming interference, for preventing a third party from hearing the communication, and for enhancing the efficiency of frequency usage.

In order to achieve the above object, the present invention is provided with a radio communication system adapting time division duplexing/frequency hopping, comprising: a data source for providing transmission data or receiving input of reception data; a hop frequency generator for generating preset frequency changes at every given time; a frequency modulator for modulating frequency according to the transmission frequency corresponding to the hop frequency with provision of the transmission data; a power amplifier for power-amplifying output of the frequency modulator; an antenna for receiving input of a signal outputted from the power amplifier at a regular time period and radiating the inputted signal or receiving reception data; a bandpass filter for bandpass-filtering reception data received from the antenna depending upon is the hop frequency; a switch for connecting the antenna with the power amplifier upon transmission and connecting the antenna with the bandpass filter upon reception; a reception frequency mixer for receiving input of the bandpass-filtered reception signal and mixing the received signal with reception frequency corresponding to the hop frequency; an intermediate frequency mixer for receiving output of the reception frequency mixer and mixing the received signal with an intermediate frequency; and a frequency demodulator for receiving output of the intermediate frequency mixer, demodulating frequency, and again inputting the demodulated frequency to the data source.

The present invention is more specifically described in the following paragraphs by reference to the drawing attached only by way of example.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT(S)

In an embodiment of the present invention to accomplish the above object, data is modulated to be transmitted/received by radio with using frequency changed into frequencies previously set at a regular time.

It is noted that numeral specific details such as concrete components composing the circuit and the frequency, are set forth to provide a more thorough understanding of the present invention. It will be apparent, however, to one skilled in the art that the present invention may be practiced without these specific details. The detailed description of known functions and constructions unnecessarily obscuring the subject matter of the present invention will be avoided in the present invention.

Figure 1:
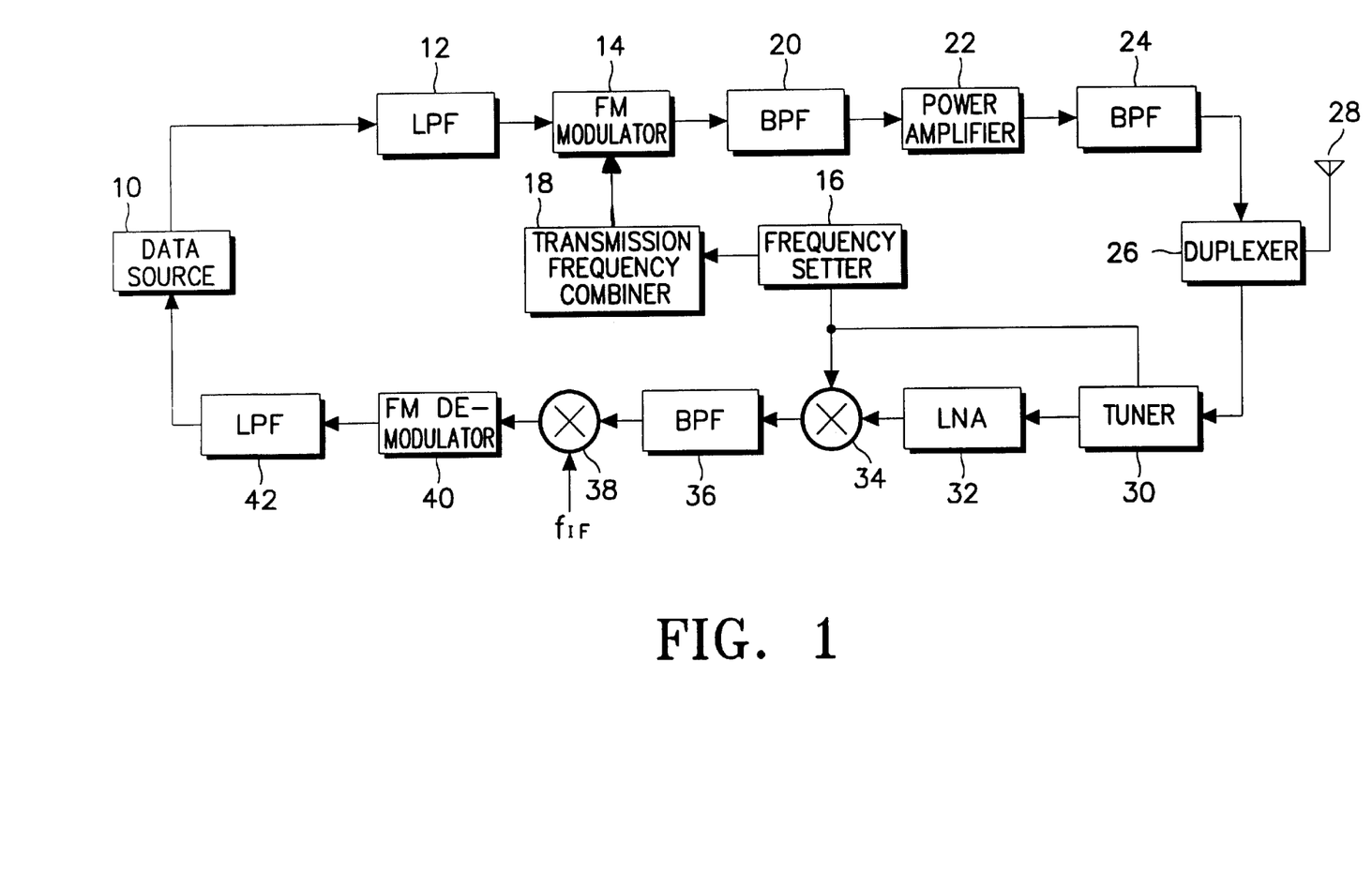
FIG. 1 is a diagram showing the construction of a radio communication system of FM modulation/demodulation.

FIG. 1 is a diagram showing the construction of a radio communication system using frequency modulation/demodulation. In FIG. 1, data generated from a data source 10 is input to a low pass filter 12 (hereinafter, referred to as LPF) and lowpass-filtered. A frequency setter 16 controls a transmission frequency combiner 18 so as to convert the data of the preset transmission frequency. Transmission frequency combiner 18 outputs the transmission frequency corresponding to the preset transmission frequency to an FM modulator 14 in correspondence with the control of frequency setter 16. At this time, FM modulator 14 receives input of the lowpass-filtered data and performs the frequency modulation according to the transmission frequency. Here, the frequency-modulated data is called as the transmission data. The transmission data is input to a band pass filter 20 (hereinafter, referred to as BPF). The transmission data bandpass-filtered by BPF 20 is inputted to a power amplifier 22. Power amplifier 22 amplifies the bandpass-filtered transmission data and then inputs the amplified transmission data to a BPF 24. BPF 24 outputs a bandpass-filtered amplified transmission signal a duplexer 26. Duplexer 26 radiates the bandpass-filtered amplified transmission signal through an antenna 28.

In the meanwhile, upon reception, a signal received from antenna 28 is input through duplexer 26 to a tuner 30. Then, a tuning frequency of tuner 30 is provided as the same frequency as the reception frequency preset in frequency setter 16. The output of tuner 30 is input to a low noise amplifier 32 (hereinafter, referred to as LNA). In this case, LNA 32 amplifies the input signal and outputs the amplified signal to a mixer 34. Mixer 34 mixes the reception frequency preset in frequency setter 16 with the reception signal of LNA 32 and performs a typical down-conversion.

On the other hand, the output of mixer 34 is input to a BPF 36 and forms a reception signal of the intermediate frequency level. The reception signal is input to a mixer 38 and mixed with an intermediate frequency $F_{IF}$. The mixed signal is input to an FM demodulator 40. In this event, the output of FM demodulator 40 as a bandpass signal is input through a LPF 42 to data source 10.

Figure 2A:
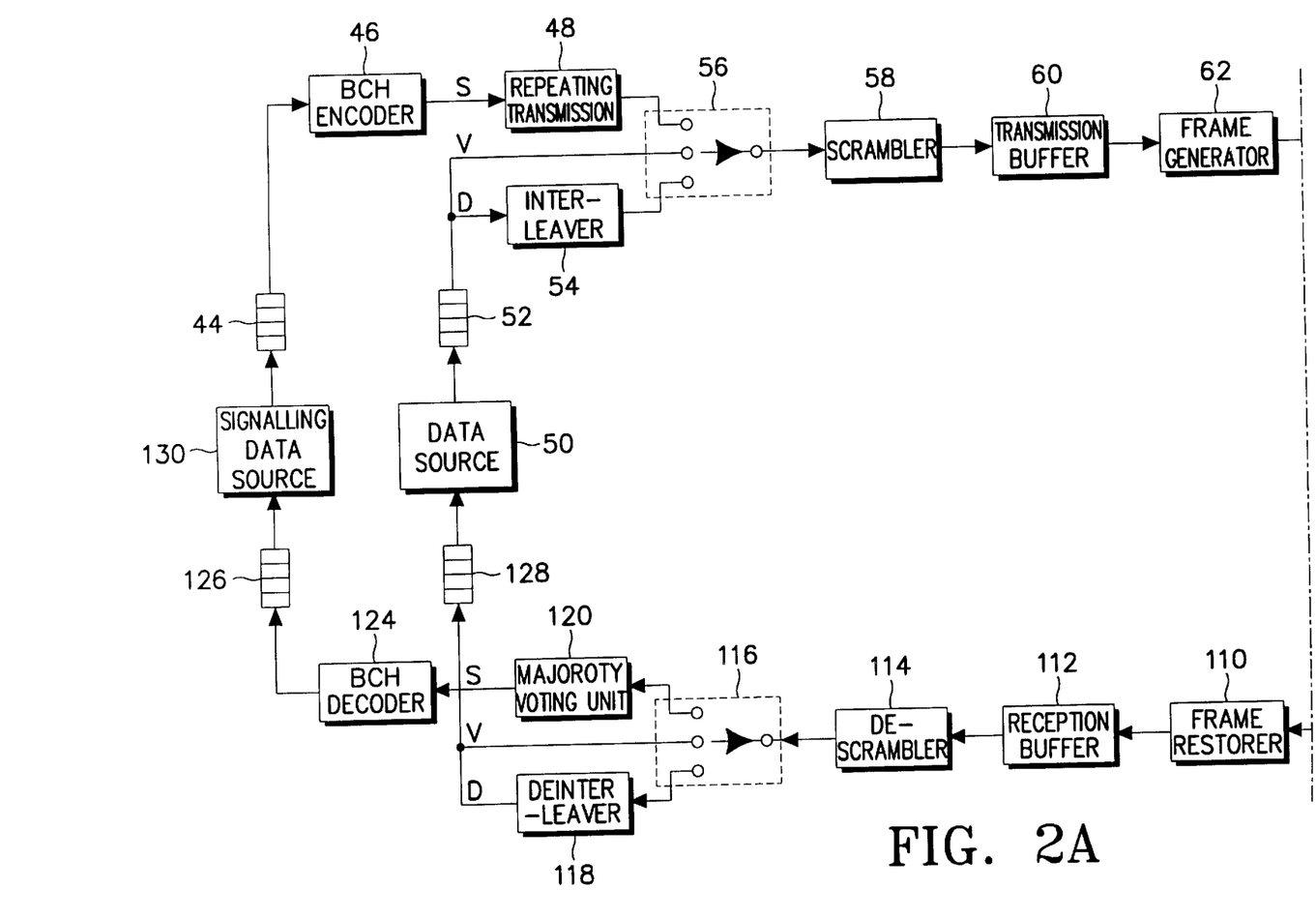
FIGS. 2A and 2B are block diagrams showing the construction of a radio communication system adapting time division duplexing/frequency hopping according to an embodiment of the present invention.
Figure 2B:
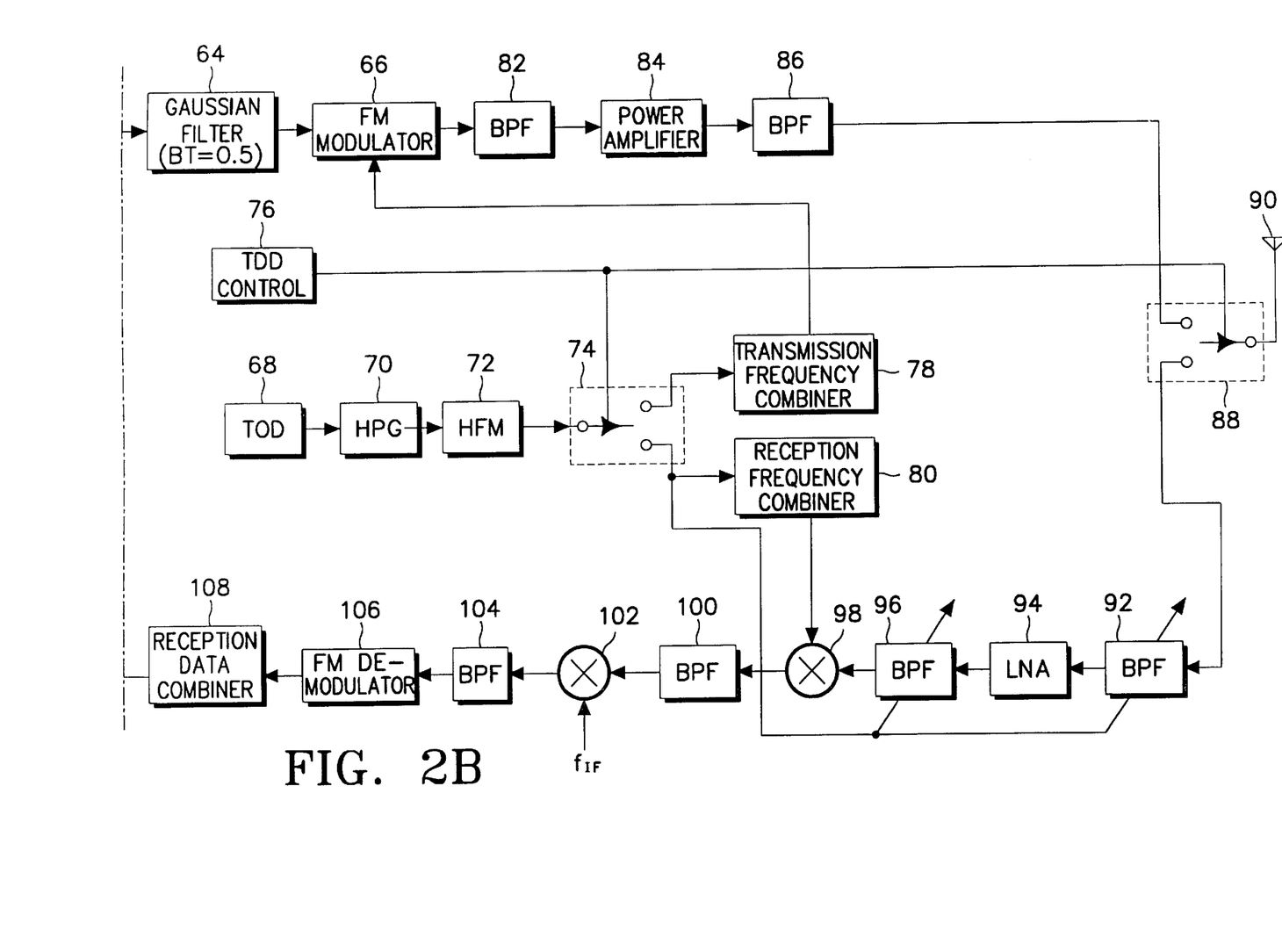

FIGS. 2A and 2B are block diagrams showing the construction of a radio communication system adapting time division duplexing/frequency hopping according to an embodiment of the present invention. For convenience of explanation, FIGS. 2A and 2B are totally called as FIG. 2, hereinafter.

In an embodiment of FIG. 2, an example is taken by the case that source data rate is 16 ksps. Also, TDD (time division duplexing) is used in FIG. 2. At this point, burst time of TDD is 5 ms. Further, the TDD rate is 200 Hz. Resultedly, transmission is performed for 5 ms and reception is performed for 5 ms. FH (frequency hopping) as band spread communication system is adapted therein. A carrier wave hopping frequency is variably set every 5 ms and a usage frequency band thereof is 230 MHz–290 MHz.

The present invention uses GFSK (gaussian filtered minimum shift keying) and BT is 0.5. A symbol rate of the TDD data is 40 ksps and BT is filtered as 0.5. Therefore, a bandwidth of the modulated signal is 40 kHz. The bandwidth occupied by the modulated signal is 40 kHz and total bandwidth used is 60 MHz. Thus, there are 1500 tones (frequencies or channels) in total bandwidth. Also, transmission and reception are in turn performed at every 5 ms with TDD. Furthermore, the carrier wave frequency is changed at event 5 ms with FH. At this time, the carrier wave frequency is set by a hop pattern in 230 MHz–290 MHz. Here, the determination of the hop pattern is selected in 1500 frequencies, at random.

Most of all, data is divided into signaling data for signaling or control required for communication, data traffic for data communication, and voice traffic for communication of voice signal.

A signaling data source 130 which provides the signaling data and outputs the signaling data to a first FIFO (first-in first-out) 44. FIFO 44 outputs the signaling data to a BCH (Bose-Chaudhuri-Hocqueghen) encoder 46, sequentially. At this case, BCH encoder 46 BCH-encodes the signaling data. Also, it outputs the BCH-encoded data to a repeating transmitter 48. Therefore, the signaling data is repeatedly transmitted to a data source selector 56. Here, the path is indicated as S of FIG. 2A.

Meantime, a data source 50 provides the voice traffic or the data traffic. Data source 50 inputs the voice traffic or the data traffic to a second FIFO 52. FIFO 52 outputs the voice traffic or data traffic, sequentially.

Herein, when the output of FIFO 52 is the voice traffic, the output is directly input to data source selector 56. In this case, the path is indicated as V of FIG. 2A.

As well, when the output of second FIFO 52 is the data traffic, the output is input to an interleaver 54. The data traffic interleaved in interleaver 54 is input to data source selector 56. Here, the path is indicated as D of FIG. 2A.

Then, data source selector 56 selects one of the signaling data, the data traffic, and the voice traffic. Also, data source selector 56 outputs the selected data at a transmission speed of 16 ksps.

In this instance, BCH encoder 46, repeating transmitter 48, and interleaver 54 are used to heighten the reliability of the data. BCH encoder 46 has an error correction and checking function and repeating transmitter 48 has also the same function as that of BCH decoder 46. Likewise, interleaver 54 has an error randomization function.

The output of data source selector 56 is input to a scrambler 58. Scrambler 58 receives the output of data source selector 56 and scrambles the received output thereof. Here, the output of data source selector 56 is scrambled by the reason that recognition of the data by a third party is prevented and continuous generation of 1 or 0 of the data columns is prevented, thereby easily modulating the data in a transmission terminal. In a reception terminal, restoration of the data and the clock can be easily performed. The output of scrambler 58 is input to a transmission buffer 60. Transmission buffer 60 receives the input from scrambler 58 of 16 ksps and buffers the received input thereof 50 as to perform TDD communication. In this case, since data of 32 ksps should be transmitted upon transmission of the data, the buffering function is necessary for data rate conversion. The output data of transmission buffer 60 is 32 ksps. Then, while the data of 32 Ksps is output when the state of a TDD control 76 is transmission, there is no data output when the state of the TDD control 76 is reception. As a result, transmission buffer 60 outputs the input signal for 5 ms and outputs no signal for next 5 ms.

The 32 ksps data generated at every burst of 5 ms depending on TDD control 76 is input to a frame generator 62. Frame generator 62 converts the input data into a TDD packet structure and outputs the data column of 40 ksps.

Figure 3:
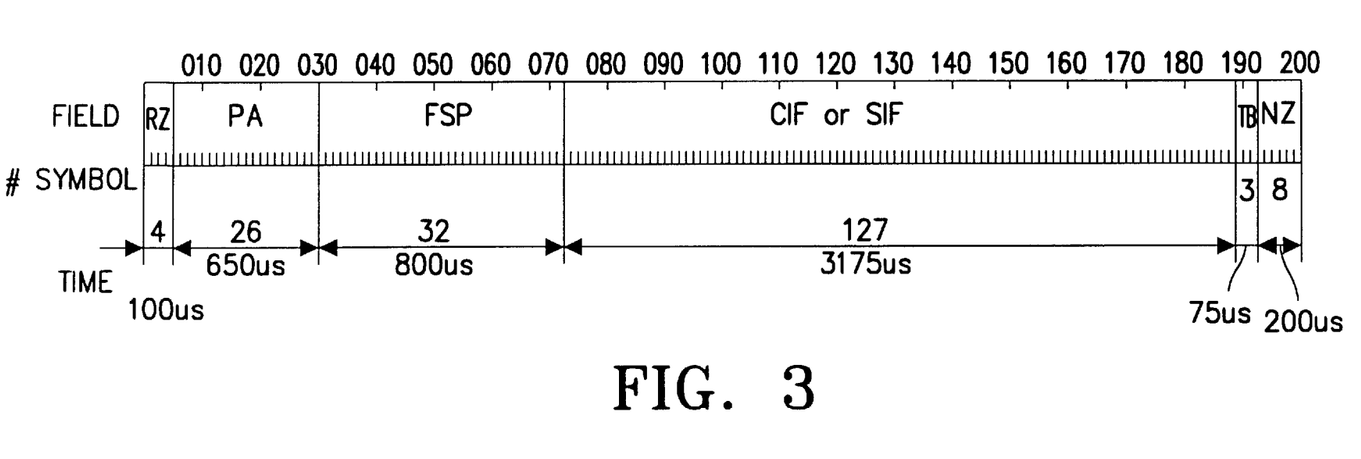
FIGS. 3 and 4 are diagrams showing TDD packet according to an embodiment of the present invention.

In the meanwhile, FIGS. 3 and 4 are diagrams showing a TDD packet according to an embodiment of the present invention. In particular, FIG. 3 shows the control signaling packet, where one packet is included with 200 symbols. A RZ (ramp zone) of FIG. 3 as 4 symbols performs a buffering function between packets. A PA (pre-ample pattern) is 26 symbols, which is a region necessary for establishment of synchronization of the packet with a FSP (frame sync pattern) as 32 symbols. Also, a CIF (control information field) and a SIF (signaling information field) correspond to a real signaling data field for transmission as 127 symbols. A TB (tail bit) is 3 symbols and a NU (null zone) is 8 symbols, which is made by considering the round trip delay related to the radio wave delay of the signals between systems.

Figure 4:
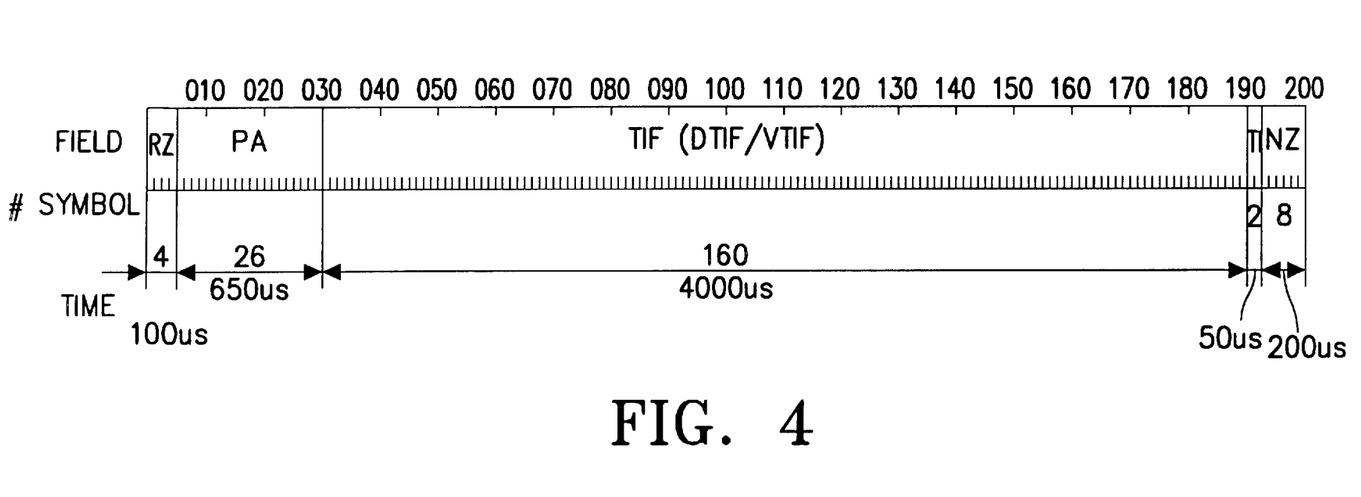

On the other hand, in FIG. 4 showing data and voice traffic packets, one packet is included with 200 symbols. A RZ (ramp zone) of FIG. 4 as 4 symbols performs a buffering function between packets. A PA (pre-ample pattern) is 26 symbols, which is a region necessary for establishment of the synchronization of the packet. Also, a TIF (traffic information field) corresponds to a real voice traffic field or a data traffic field for transmission as 160 symbols. A TB (tail bit) is 3 symbols and a NU (null zone) is 8 symbols, which is made by considering the round trip delay related with the radio wave delay of the signals between systems.

A frame has a transmission speed of 40 ksps and is output in bursts. That is, the frame is output for 5 ms and is not output for 5 ms. The frame is input to a gaussian filter 64. At this moment, gaussian filter 64 receives the input of the frame and thus, is filtered as BT of 0.5. Accordingly, the frame is pulse-shaped with a gaussian filtering system. Thus, the frame is GFSK-modulated. The output of gaussian filter 64 performs the FM modulation with the transmission carrier wave frequency in an FM modulator 66. Here, FM modulator 66 performs the same function as that of a conventional FM modulator. However, the transmission carrier wave frequency is converted at every hop. As a result, the output frequency of the FM modulator 66 is not fixed and thus, converted at every hop, at random.

A process of, at random, converting the frequency at every hop will be explained as follows. TOD 68 outputs time information. Also, the time information is called the TOD information. The TOD information is input to hop pattern generator (HPG) 70. HPG 70 receives the input of the TOD information and generates the hop pattern.

For instance, when TOD=1, TOD=2, TOD=3, ... TOD=T, HPG 70 generates the hop patterns as shown in following explanation 1.

$H^1 = h_1^1, h_2^1, h_3^1 \ldots h_N^1; TOD=1$ $H^2 = h_1^2, h_2^2, h_3^2 \ldots h_N^2; TOD=2$ $H^3 = h_1^3, h_2^3, h_3^3 \ldots h_N^3; TOD=3$ $H^T = h_1^T, h_2^T, h_3^T \ldots h_N^T; TOD=T$    Expression 1

In the above expression 1, character "N" is represented as the length of the hop pattern. For instance, when N=1500, the period of the hop pattern is 1500 and 1500 hop frequencies are changed then to perform the communication.

The hop pattern generated from the HPG 70 is input to a hop frequency mapper (HFM) 72. Thus, HFM 72 maps the real frequency. The process of mapping the real frequency is discussed below.

The hop pattern is given as in following expression 2.

$H = h_1, h_2, h_3, \ldots h_N$    Expression 2

Here, in the above expression 2, when $h_1=4$, $h_2=1000$, $h_3=1123$, and $h_N=5$, the hop frequency determined by the hop pattern as described above is given as in following expression 3.

$F = F_4, F_{1000}, F_{1123}, \ldots F_5$    Expression 3

At this case, the output of HFM 72 is input to a transmission frequency combiner 78 or a reception frequency combiner 80 according to transmission/reception in a transmission/reception selection switch 74.

TDD control 76 outputs a TDD state signal indicative of whether the TDD is in the transmission state or the reception state. Here, when the TDD state signal indicates that the TDD is in the transmission state, the transmission/reception selection switch 74 is connected to the reception frequency combiner 80, thereby controlling combination of the frequency for next transmission in the reception frequency combiner 80. Meantime, when the TDD state signal indicates that the TDD is in the reception state, the transmission/reception selection switch 74 is connected to the transmission frequency combiner 78, thereby controlling combination of the frequency for next transmission in the transmission frequency combiner 78.

Transmission frequency combiner 78 and reception frequency combiner 80 combine the frequency hopped as shown in the above expression 3. Here, the reception/transmission hop patterns are not equal to each other and are different from each other, conventionally. Consequently, transmission frequency combiner 78 and reception frequency combiner 80 generate the frequency hopped by the hop pattern, at every hop. The frequency generated at this case is used as the carrier wave. Thus, upon communication, the carrier wave is not fixed and is hopped as the frequency changed at every hop, thereby performing the communication.

The output of transmission frequency combiner 78 is the frequency changed at every hop. The output of transmission frequency combiner 78 is input to an FM modulator 66. Then, since FM modulator 66 modulates the output of gaussian filter 64 and the output of transmission frequency combiner 78, the frequency as the output of FM modulator 66 is hopped. The output of FM modulator 66 is input to a power amplifier 84 after being bandpass-filtered through a BPF 82. The output of power amplifier 84 is input to a BPF 86 after power-amplifying the signal. The bandpass-filtered signal output from BPF 86 is input to a transmission/reception selection switch 88. Thus, when the TDD state signal is in the transmission state, the bandpass-filtered signal is controlled to be radiated through an antenna 90. However, when the TDD state signal is in the reception state, the transmission/reception selection switch 88 is connected to a BPF 92. Accordingly, the signal received through antenna 90 is input to BPF 92.

At this point, BPF 92 and a BPF 96 control the frequency tuning by the hop pattern. Namely, the hop pattern generated from HPG 70 is frequency-mapped in an HFM 72. The frequency-mapped hop frequency is input through transmission/reception selection switch 74 to BPFs 92 and 96, thereby adjusting the bandpass of BPFs 92 and 96. Thus, the bandpass is adjusted at every hop.

In the meanwhile, the reception signal passing through BPF 92 is input to an LNA (low noise amplifier) 94. LNA 94 amplifies the reception signal before it is input to BPF 96. BPF 96 bandpass-filters the reception signal in correspondence with the tuning bandpass. The bandpass-filtered signal is input to a mixer 98. Mixer 98 mixes the frequency combined in the reception frequency combiner 80, with the bandpass-filtered signal and performs down-conversion. At this time, the frequency combined in the reception frequency combiner 80 is also varied, depending upon the hop pattern, at every hop. The output of mixer 98 is bandpass-filtered by a BPF 100 and the bandpass-filtered signal is input to a mixer 102. Mixer 102 mixes the bandpass-filtered signal with an intermediate frequency $f_{IF}$. The mixed signal is input to a BPF 104. BPF 104 bandpass-filters the signal and inputs the bandpass-filtered signal to an FM demodulator 106. FM demodulator 106 demodulates the bandpass-filtered signal and generates a baseband signal. At this moment, a reception data reproducer 108 demodulates the reception data to be burst by using the output of FM demodulator 106. The demodulation is performed at 40 ksps. The demodulated data performs deframing in a frame reproducer 110. At this point, in comparison with frame generator 62, frame reproducer 110 recognizes a starting point and a ending point of the TDD packet by using PA or FSP as depicted in FIGS. 3 and 4, and only detects a real information field just like CIF, SIF, or TIF, and outputs the detected information to be burst at a speed of 32 ksps. The output of frame reproducer 110 of burst 32 ksps is input to a reception buffer 112. Reception buffer 112 outputs the burst and input information of 32 ksps as consecutive data of 16 ksps in correspondence with transmission buffer 60, and performs the buffering operation necessary for variation of ratio of the data, totally.

The output of reception buffer 112 is input to descrambler 114. Descrambler 114 corresponds to scrambler 58 and descrambles the input data. The output of descrambler 114 is input to a data selector 116. At this time, an output path is differently adjusted depending upon whether the reception data is the control signaling data, the voice traffic, or the data traffic.

Here, when the reception data is the control signaling data, the control signaling data is input to a majority voting unit 120. The majority voting unit 120 majority-votes the input control signaling data in correspondence with repeating transmitter 48 and thus, corrects error.

To the contrary, the output of the majority voting unit 120 is input to a BCH decoder 124. BCH decoder 124 BCH-decodes the output of the majority voting unit 120. Then, the BCH-decoded control signaling data is input to a third FIFO 126. FIFO 126 sequentially inputs the inputted control signaling data to signaling data source 130.

In this instance, when the reception data is the voice traffic, the voice traffic is input through a fourth FIFO 128 to data source 50. Also, when the reception data is the data traffic, the data traffic is input to a deinterleaver 118. Accordingly, the reception data is deinterleaved and input through FIFO 128 to data source 50.

The radio communication system adapting the TDD/FH according to the present invention uses the FH and TDD, is thereby capable of performing the broadband frequency hopping. Further, the radio communication system using the TDD/FH in accordance with the present invention can perform forcible error correction with introducing the TDD packeting invented for the communication of the TDD. As a consequence, the reliability of the control data can be enhanced. In case of the data traffic, the interleaving and randomization of the bit error can be performed. Furthermore, the error can be easily corrected upon adhering another error corrector.

Moreover, the radio communication system adapting the TDD/FH according to the present invention processes the data source depending upon the control signaling, the voice traffic, and the data traffic. Hearing by a third party is impossible with using the scrambling. Even when 1 or 0 is consequentially generated in the information data, the bit pattern is randomized to thereby easily restore and stably modulate the data and the clock in reception terminal and to randomize the bit pattern.

As well, the radio communication system adapting the TDD/FH according to the present invention can heighten the frequency usage efficiency by using GFSK. The frequency usage efficiency can be increased in comparison to conventional FDD with adapting the TDD communication system. The present invention has not duplexer required for the conventional FDD and uses a TDD switch instead of the duplexer, thereby having advantages in that the present invention can be embodied at low-price, low-power, miniaturization and light-weight. The hearing can be difficult by the third party in contrast with the general fixed frequency with adapting the communication system of the frequency hopping. Therefore, although there is the interference by intentional/unintentional jammer, the communication is possible.

Therefore, it should be understood that the present invention is not limited to the particular embodiment disclosed herein as the best mode contemplated for carrying out the present invention, but rather that the present invention is not limited to the specific embodiments described in this specification, except as defined in the appended claims.

What is claimed is:

1. A radio communication system adapting time division duplexing/frequency hopping, comprising:

a data source for providing transmission data or receiving input of reception data;

a hop frequency generator for generating frequency changed as frequencies preset at every given time;

a frequency modulator for modulating frequency according to the transmission frequency corresponding to said hop frequency with provision of said transmission data;

a power amplifier for power-amplifying output of said frequency modulator;

an antenna for receiving input of a signal outputted from said power amplifier at a regular time period and radiating said inputted signal or receiving reception data;

a bandpass filter for bandpass-filtering reception data received from said antenna depending upon said hop frequency;

a switch for connecting said antenna with said power amplifier upon transmission and connecting said antenna with said bandpass filter upon reception;

a reception frequency mixer for receiving input of said bandpass-filtered reception signal and mixing said received signal with reception frequency corresponding to said hop frequency;

an intermediate frequency mixer for receiving output of said reception frequency mixer and mixing said received signal with an intermediate frequency; and a frequency demodulator for receiving output of said intermediate frequency mixer, demodulating frequency, and again inputting said demodulated frequency to said data source.

2. The system as recited in claim 1, further comprising:

a frame generator for receiving input of transmission data from said data source, constructing said data with packet, and inputting said data to said frequency modulator; and a frame restorer for restoring frame with output of said frequency demodulator and inputting said restored frame to said data source.

3. The system as recited in claim 1, wherein said data source is comprised of:

signaling data source for control and signaling data; and data source for data for voice data and data communication.

4. The system as recited in claim 2, further comprising:

a scrambler for receiving input of transmission data from said data source, scrambling said received data, and providing said scrambled data to said frame generator; and a descrambler for receiving output of said frame restorer, descrambling said received data, and inputting said descrambled data to said data source.

5. The system as recited in claim 4, further comprising:

a BCH encoder for receiving input of control and signaling data from said signaling data source and BCH-encoding said received data;

a repeating transmitter for receiving output of said BCH encoder and repeatedly transmitting said received data to said scrambler for error correction;

a majority voting unit for majority-voting data in case that data inputted from said descrambler is said control and signaling data; and a BCH decoder for receiving output of said majority voting unit, BCH-decoding said received data, and inputting said BCH-decoded data to said signaling data source.

6. The system as recited in claim 5, further comprising:

a transmission first-in first-out buffer for receiving input of data from said signaling data source and providing said received data to said BCH encoder; and a reception first-in first-out buffer for receiving input of data from said BCH decoder and providing said received data to said signaling data source.

7. The system as recited in claim 4, further comprising:

an interleaver for receiving input of data for data communication from data source and interleaving said received data; and a deinterleaver for deinterleaving said data in the case that data inputted from said descrambler is data for the data communication.

8. The system as recited in claim 7, further comprising:

a transmission first-in first-out buffer for receiving input of data from said data source and directly providing said received data to said interleaver or said scrambler; and a reception first-in first-out buffer for inputting data from said majority voting unit or receiving data from said descrambler, and providing said received data to said data source.

9. The system as recited in claim 1, further comprising:

a TOD for outputting time information;

a hop pattern generator for receiving input of said data depending on time from said TOD and generating hop pattern;

a hop frequency mapper for receiving input of said hop pattern from said hop pattern generator and mapping said received hop pattern as real frequency;

a time division duplexer controller for generating a time division duplexer state signal;

a transmission frequency combiner for receiving input of frequency from said hop frequency mapper and combining said received frequency with transmission frequency when said time division duplexer state signal is in transmission state; and a reception frequency combiner for receiving input of frequency from said hop frequency mapper and combining said received frequency with reception frequency when said time division duplexer state signal is in reception state.

10. A radio communication system adapting time division duplexing/frequency hopping, comprising:

means for outputting signaling data;

a BCH encoder for outputting BCH encoded data by BCH encoding said signaling data;

means for outputting voice or data traffic;

first selection means for selectively providing said BCH encoded data, said voice traffic and said data traffic to a scrambler, said scrambler outputting a scrambled signal;

means for buffering said scrambled signal and outputting a data rate converted signal according to a time division duplexing control signal;

means for generating time division duplexing data packets by packet structuring said data rate converted signal into frames of data;

gaussian filter means for filtering said time division duplexing data packets and outputting pulse shaped signals;

frequency modulation means for generating frequency modulated signals by modulating said pulse shaped signals with transmission carrier waves;

means for generating said transmission carrier waves, wherein said transmission carrier waves are produced using a frequency hopping method;

bandpass filter means for outputting a transmission signal filtering and amplifying the frequency modulated signals output from said frequency modulation means; and second selection means for selectively providing said transmission signal to an antenna in response to said time division duplexing control signal.

11. The radio communication system adapting time division duplexing/frequency hopping as set forth in claim 10, wherein said means for generating said transmission carrier waves comprises:

means for generating timing information;

means for generating a frequency hop pattern in response to said timing information;

means for real frequency mapping of said frequency hop pattern for generating random hop frequencies;

third selection means for selectively providing said hop frequencies to a transmission frequency combiner in response to said time division duplexing control signal; and said transmission frequency combiner combining a preset transmission frequency with said hop frequencies for output to said frequency modulation means.

12. The radio communication system adapting time division duplexing/frequency hopping as set forth in claim 10, further comprising repeating transmission means for repeatedly transmitting said BCH encoded data to said first selection means.

13. The radio communication system adapting time division duplexing/frequency hopping as set forth in claim 10, further comprising means for providing interleaved data traffic to said first selection means by interleaving said data traffic.

14. The radio communication system adapting time division duplexing/frequency hopping as set forth in claim 10, wherein said means for outputting signaling data comprises a signaling data source for outputting said signaling data and a FIFO for providing said signaling data to said BCH encoder.

15. The radio communication system adapting time division duplexing/frequency hopping as set forth in claim 10, wherein said means for outputting voice or data traffic, a data source for outputting said voice or data traffic and a FIFO for providing said voice or data traffic to said first selection means.

16. The radio communication system adapting time division duplexing/frequency hopping as set forth in claim 10, further comprising:

means for generating timing information;

means for generating a frequency hop pattern in response to said timing information;

means for real frequency mapping of said frequency hop pattern for generating random hop frequencies;

third selection means for selectively providing said hop frequencies to a reception frequency combiner in response to said time division duplexing control signal; and said reception frequency combiner generating a reception frequency hop signals by combining a preset reception frequency with said hop frequencies.

17. The radio communication system adapting time division duplexing/frequency hopping as set forth in claim 16, further comprising:

variable band pass filtering means responsive to said reception frequency hop signals for passing signals received from said antenna;

first mixing means for generating a down converted signal by mixing output signals passed by said variable band pass filtering means with said reception frequency hop signals;

means for generating a mixed signal by mixing said down converted signal with an intermediate frequency;

frequency demodulator means for generating a baseband signal by FM demodulating said mixed signal;

means for outputting real data by demodulating said baseband signal and deframing said baseband signal;

means for generating received signaling data, voice traffic or data traffic by descrambling said real data;

fourth selection means for selectively outputting said signaling data, voice traffic or data traffic to a BCH decoder or said means for outputting voice or data traffic; and said BCH decoder for BCH decoding said signaling data for input to said means signaling data.

* * * * *